US012654640B2

(12) United States Patent
Andres et al.

(10) Patent No.: US 12,654,640 B2
(45) Date of Patent: Jun. 16, 2026

(54) SYSTEMS AND METHODS FOR ACTIVATION AND DEACTIVATION OF VEHICLE AUTOMATIONS

(71) Applicant: Ford Global Technologies, LLC, Dearborn, MI (US)

(72) Inventors: Russell Andres, Riverview, MI (US); Alexandra Alioto, Bloomfield Hills, MI (US); Lisa Gentile, Ave Maria, FL (US); Christopher Cruse, Westland, MI (US)

( * ) Notice: Subject to any disclaimer, the term of this patent is extended or adjusted under 35 U.S.C. 154(b) by 28 days.

(21) Appl. No.: 18/811,291

(22) Filed: Aug. 21, 2024

(65) Prior Publication Data

US 2026/0054668 A1     Feb. 26, 2026

(51) Int. Cl.
*B60R 16/037* (2006.01)
*B60K 35/10* (2024.01)
*B60R 16/023* (2006.01)

(52) U.S. Cl.
CPC ............ *B60R 16/037* (2013.01); *B60K 35/10* (2024.01); *B60R 16/023* (2013.01)

(58) Field of Classification Search
CPC ...... B60R 16/037; B60R 16/023; B60K 35/10
See application file for complete search history.

(56) References Cited

U.S. PATENT DOCUMENTS 7,454,271 B2    11/2008  Boutin et al.
9,855,957 B2     1/2018  Reilhac
2013/0124009 A1  5/2013  Esler 2015/0353037 A1* 12/2015 Graham ................ B60R 16/037
                                                          701/49
2016/0375787 A1* 12/2016 Liu ......................... B60L 58/12
                                                          701/22
2019/0176624 A1*  6/2019 Powell ................... B60K 35/10
2023/0154245 A1   5/2023 Fang et al.

FOREIGN PATENT DOCUMENTS

CN          104379414 A      2/2015

OTHER PUBLICATIONS

Sonatus, Innovate Throughout The Vehicle Lifecycle, https://www.sonatus.com/products/automator/, May 31, 2023, pp. 1-12.

* cited by examiner

*Primary Examiner* — Wade Miles
*Assistant Examiner* — Jaewook Jung
(74) *Attorney, Agent, or Firm* — Joseph Zane; Eversheds Sutherland (US) LLP

(57)          ABSTRACT

A vehicle including a transceiver, a memory and a processor is disclosed. The transceiver may be configured to receive a first trigger signal and a second trigger signal. The processor may be configured to determine pre-automation operational states associated with a plurality of vehicle components and optimal operational states associated with a set of vehicle components associated with an automation mode, responsive to obtaining the first trigger signal. The processor may further store an information associated with the pre-automation operational states in the memory, and cause the set of vehicle components to operate based on the optimal operational states. The processor may further restore operational states associated with the set of vehicle components back to their respective pre-automation operational states based on the information associated with the pre-automation operational states, responsive to obtaining the second trigger signal.

20 Claims, 7 Drawing Sheets

SYSTEMS AND METHODS FOR ACTIVATION AND DEACTIVATION OF VEHICLE AUTOMATIONS

FIELD

The present disclosure relates to systems and methods for controlling vehicle component operation on activation and deactivation of vehicle automations.

BACKGROUND

Many modern vehicles enable users to activate one or more vehicle automations based on user's requirements, which causes automatic adjustment of vehicle components for user's convenience. For example, when a user desires to watch a movie in a vehicle, the user may activate a vehicle's cinema/movie mode, which may cause the vehicle to automatically adjust operational states of vehicle's interior lights, sound systems, windows, etc. to enable the user to comfortably view the movie. Such operational states of vehicle components for each automation mode may be defined by a vehicle manufacturer, and/or may be set or customized by the user as per user's preference.

While the automations provide many benefits to the users, there are instances where the users may desire additional features to further enhance user's experience of using the automations in the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
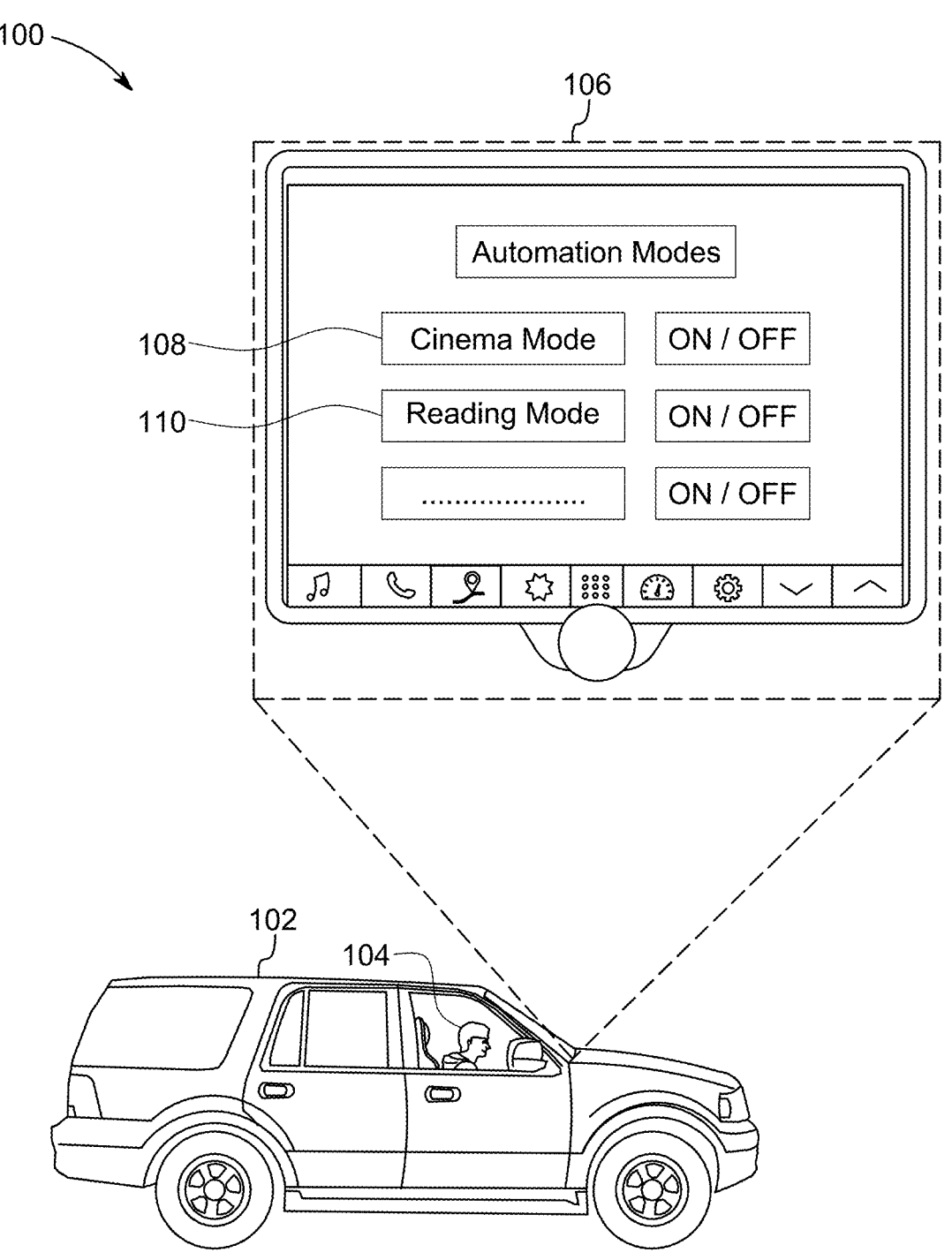
FIG. 1 depicts an environment in which techniques and structures for providing the systems and methods disclosed herein may be implemented.

The present disclosure describes a vehicle that may enable a user or system to conveniently activate and deactivate one or more automations or automation modes in the vehicle, without requiring the user to manually restore operational states/settings of vehicle components every time the user deactivates an automation mode. In the present disclosure, the terms "automations" and "automation modes" are used interchangeably. The vehicle may obtain a request/trigger signal (e.g., a "first trigger signal") from the user to activate an automation mode (e.g., a "first activation mode", such as a cinema mode) via a user device or a vehicle Human-Machine Interface (HMI) when the user desires to activate the vehicle's cinema mode. In other aspects, the vehicle may automatically obtain the first trigger signal (and other trigger signals described in the present disclosure) from a vehicle system or a vehicle control unit ("system"), when one or more predefined conditions preset by the user are met (e.g., when the vehicle speed reduces below a predefined speed threshold, when ambient light reduces below a predefined illumination intensity threshold, when the vehicle enters a predefined geolocation, and/or the like). Responsive to obtaining the first trigger signal, the vehicle may determine existing or "pre-automation" operational states of a plurality of vehicle components. The vehicle may further store information associated with the determined pre-automation operational states in a vehicle memory.

The vehicle may further determine a set of vehicle components (e.g., a first set of vehicle components) whose operational states should be adjusted in the cinema mode, and associated optimal operational states (e.g., first optimal operational states). Responsive to such determination, the vehicle may cause the first set of vehicle components to operate in the first optimal operational states. For example, the vehicle may cause the vehicle's interior lights to illuminate in blue color, the vehicle's fan speed to turn low, the vehicle's interior temperature to get adjusted to 72-75 degrees Fahrenheit, the vehicle's sitting areas to get heated, and/or the like, responsive to obtaining the first trigger signal (i.e., when the cinema mode is activated).

To deactivate the cinema mode or the vehicle's automation mode, the user or the system may transmit another trigger signal (e.g., a "second trigger signal") to the vehicle via the user device, the HMI or the vehicle control unit. Responsive to obtaining the second trigger signal, the vehicle may fetch the information associated with the pre-automation operational states from the memory, and automatically cause the first set of vehicle components to operate in their respective pre-automation operational states. In this manner, the vehicle eliminates the need for the user to manually restore or pre-program operational settings/states of vehicle components when the user deactivates the vehicle's automation mode.

In further aspects, the vehicle may enable the user or system to activate a new automation mode (e.g., a "second automation mode", such as a reading mode) while the first automation mode (e.g., the cinema mode) may already be getting executed in the vehicle (i.e., before the vehicle receives the second trigger signal described above). To activate the reading mode while the cinema mode is already being executed in the vehicle, the user or the system may transmit a third trigger signal to the vehicle via the user device, the HMI or the vehicle control unit. The third trigger signal is received by the vehicle before the second trigger signal. Responsive to obtaining the third trigger signal, the vehicle may determine a second set of vehicle components whose operational states should be adjusted in the reading mode, and associated second optimal operational states.

Responsive to such determination, the vehicle may cause the second set of vehicle components to operate in the second optimal operational states.

Further, in this case, the vehicle may identify those vehicle components that are part of the first set of vehicle components but not part of the second set of vehicle components. The vehicle may cause such vehicle components to go back or revert to their respective pre-automation operational state responsive to activating the reading mode.

In additional aspects, the vehicle may further enable the user to adjust operational states of one or more vehicle components while an automation mode may be getting executed in the vehicle. The user may adjust the operational states anytime when an automation mode may be getting executed in the vehicle. For example, the user/system may first activate a first automation mode, then manually override operational states of one or more vehicle components, and then activate a second automation mode (or a third, fourth, etc. subsequent automation mode). In this case, when the second automation mode is activated, the vehicle may not alter the operational states of the vehicle components adjusted by the user. In yet another aspect, the user may further provide/input user preferences associated with default operational states of one or more vehicle components. The user may specify the default operational states before an automation mode is being activated, or even during the operation of an automation mode. Stated another way, the user may specify the default operational states of one or more vehicle components anytime. In this case, the vehicle may cause such vehicle components to operate in their respective default operational states when the vehicle's automation mode may be switched OFF by the user/system.

The present disclosure discloses a vehicle that enhances user's experience and comfort of operating vehicle's automation modes. The vehicle automatically restores the operational states of vehicle components to their respective pre-automation operational states or user preferred operational states when the vehicle's automation mode is deactivated, thereby eliminating the need for the user to manually restore or pre-program the vehicle components' operational states every time the automation mode is switched OFF. The vehicle further enables the user to set/define default operational states of one or more vehicle components when no automation mode may be getting executed in the vehicle, thereby considerably enhancing user's convenience of operating the automation mode.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102 and a user 104 who may be located inside the vehicle 102. In the exemplary aspect depicted in FIG. 1, the user 104 is shown to be sitting on a driver sitting area; however, the present disclosure is not limited to such an aspect. The user 104 may be sitting on a passenger sitting area, a rear sitting area, or the like, without departing from the present disclosure scope.

The vehicle 102 may take the form of any passenger or commercial vehicle such as a car, a work vehicle, a crossover vehicle, a truck, a van, a minivan, a taxi, a bus, etc. The vehicle 102 may be a manually driven vehicle or may be configured to operate in a partially/fully autonomous mode. Further, the vehicle 102 may include any powertrain such as a gasoline engine, one or more electrically-actuated motor(s), a hybrid system, etc.

In some aspects, the vehicle 102 may enable the user 104 to select and execute one or more automation modes associated with the vehicle 102, which may cause the vehicle 102 to automatically adjust operational states of one or more vehicle components based on the automation mode selected by the user 104. As an example, the user 104 may select a "cinema mode" when the user 104 desires to watch a movie while sitting in the vehicle 102, a "reading mode" when the user 104 desires to read, and/or the like. Responsive to the user 104 selecting an automation mode to execute, the vehicle 102 may automatically adjust operational states of one or more vehicle components that may be associated or mapped with the selected automation mode. For example, when the user 104 selects the "cinema mode", the vehicle 102 may automatically cause the vehicle's interior lights to illuminate in blue color, vehicle's fan speed to turn low, vehicle's interior temperature to get adjusted to 72-75 degrees Fahrenheit, vehicle's sitting area on which the user 104 is sitting to get heated, vehicle's top portion window to close, and/or the like. Similarly, when the user 104 selects the "reading mode", the vehicle 102 may automatically cause the vehicle's interior lights to illuminate in purple color, vehicle's sitting area on which the user 104 is sitting to tilt up, vehicle's top portion window to turn to vent, and/or the like.

The vehicle components whose operational states should get adjusted for each automation mode, and the respective optimal operational states for the vehicle components may be preset by a vehicle manufacturer and/or may be set/customized by the user 104. For example, the vehicle manufacturer and/or the user 104 may pre-set the respective optimal operational states of one or more vehicle components for each automation mode, such as the "cinema mode", the "reading mode", etc., as described above.

In some aspects, the user 104 may select to execute a new automation mode (e.g., the "reading mode") while a previous automation mode (e.g., the "cinema mode") is already being implemented/executed. In other aspects, the user 104 may first deactivate a previous automation mode or cause the vehicle 102 to stop executing the previous automation mode, before selecting and executing a new automation mode. The user 104 may select to execute an automation mode by transmitting a trigger signal or a request to the vehicle 102 to activate the automation mode via a user device (shown as user device 202 in FIG. 2), a vehicle Human-Machine Interface 106 (or HMI 106), and/or the like. In the exemplary aspect depicted in FIG. 1, the HMI 106 is shown to display a plurality of automation modes, e.g., a cinema mode 108, a reading mode 110, etc. The user 104 may select any one automation mode on the HMI 106 to cause the vehicle 102 to execute the selected automation mode. In further aspects, a vehicle system ("system") or a vehicle control unit (shown as VCU 210 in FIG. 2) may automatically generate a trigger signal to activate an automation mode based on predefined conditions set by the user 104 (e.g., when the vehicle speed reduces below a predefined speed threshold, when ambient light reduces below a predefined illumination intensity threshold, when the vehicle enters a predefined geolocation, and/or the like). In the present disclosure, the step of user 104 transmitting the trigger signal may be replaced by the system transmitting the trigger signal, without departing from the scope of the present disclosure.

The vehicle 102 may be further configured to enable one or more vehicle components to automatically "go back" or revert to their respective pre-automation operational states when the user 104 deactivates or stops an automation mode, or selects and executes a new automation mode while a previous automation mode is being executed. In some aspects, a pre-automation operational state of a vehicle component, as described in present disclosure, may mean/indicate the vehicle component's operational state when the vehicle 102 is not executing any automation mode or when the automation mode activation status of all the automation modes is OFF. The process of enabling the vehicle components to revert to their respective pre-automation operational states is briefly described below, and described in detail later in the description below in conjunction with FIG. 2.

In some aspects, when the user 104 selects an automation mode (e.g., the cinema mode 108) to execute when no other automation mode is already being executed, the vehicle 102 may first determine existing or current operational states of all vehicle components (which may be hardware and/or software vehicle components). Stated another way, when the user 104 selects the cinema mode 108 when no other automation mode is already being executed, the vehicle 102 may determine pre-automation operational states associated with all the vehicle components. The examples of vehicle components include, but are not limited to, vehicle's interior/ambient lights, fan, heating, ventilation, and air conditioning (HVAC) system, vehicle's top portion window, sitting area temperature/tilt angle, side mirrors, windows, steering wheel, and/or the like.

Figure 2:
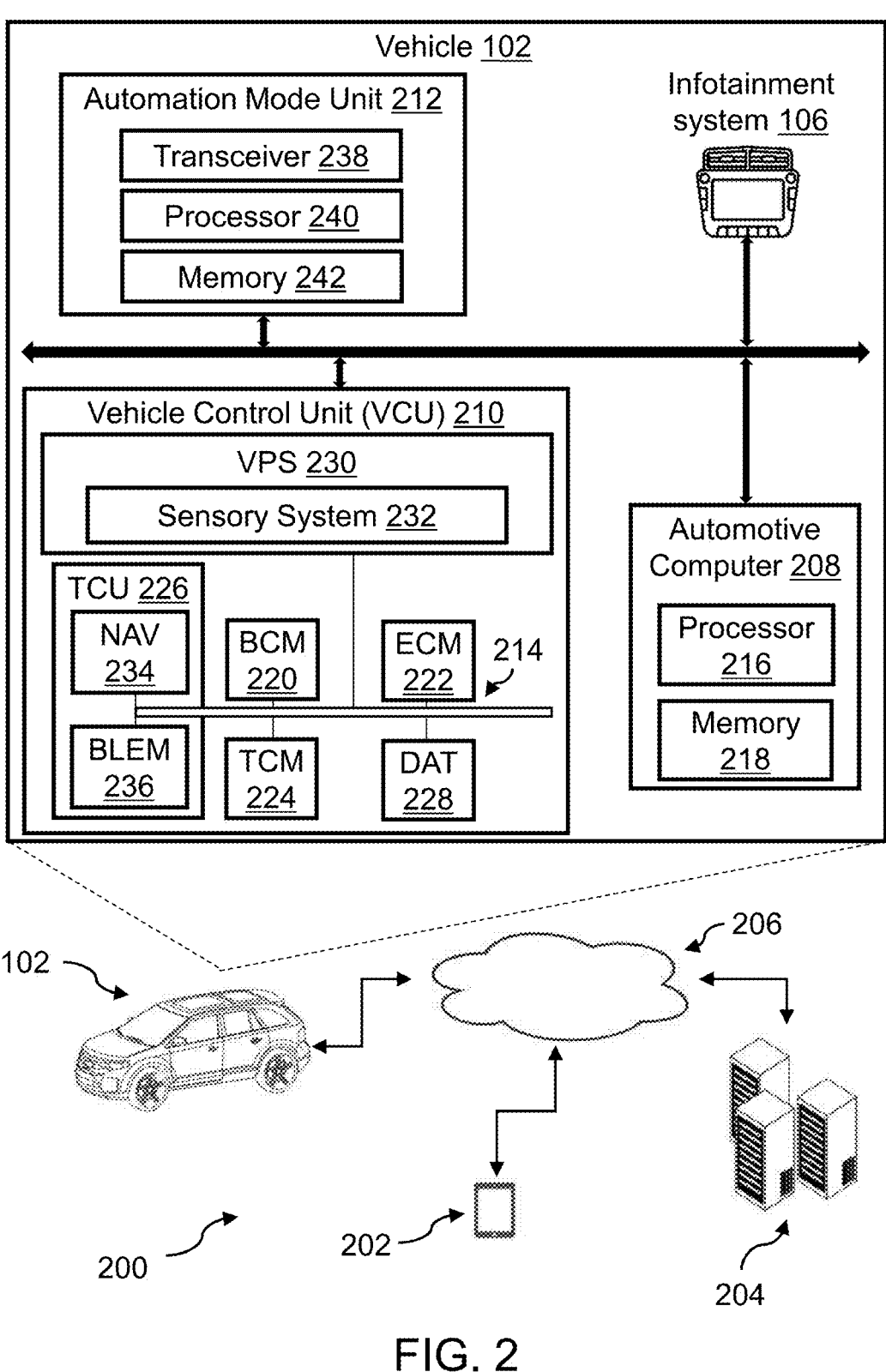
FIG. 2 depicts a block diagram of a system to control vehicle component operation on activation and deactivation of an automation mode in accordance with the present disclosure.

Responsive to determining the pre-automation operational states associated with all the vehicle components, the vehicle 102 may store information associated with the determined pre-automation operational states in a vehicle memory (shown as memory 242 in FIG. 2). The vehicle 102 may then determine a first set of vehicle components (from all the vehicle components) associated with the cinema mode 108 whose operational states are required to be adjusted, and their respective first optimal operational states (based on a mapping and operational state information stored in the vehicle memory, as described later below in conjunction with FIG. 2), when the user 104 selects to execute the cinema mode 108. The vehicle 102 may then cause the first set of vehicle components to operate in their respective first optimal operational states. For example, as described above, in this case, the vehicle 102 may automatically cause the vehicle's interior lights to illuminate in blue color, vehicle's fan speed to turn low, vehicle's interior temperature to get adjusted to 72-75 degrees Fahrenheit, vehicle's sitting area on which the user 104 is sitting to get heated, vehicle's top portion window to close, and/or the like.

In the exemplary aspect described above, the first set of vehicle components include the vehicle's interior lights, the vehicle's fan, the HVAC system, the vehicle's sitting area, the vehicle's top portion window, and/or the like. Further, in this case, the first optimal operational states include illumination of vehicle's interior lights in blue color, turning down of fan speed, adjustment of vehicle interior temperature via the HVAC system to 72-75 degrees Fahrenheit, heating of vehicle's sitting area, and/or the like.

In one example scenario, when the user 104 deactivates the cinema mode 108 or switches OFF the vehicle's automation mode, the vehicle 102 may automatically cause the operational states associated with the first set of vehicle components to "go back" or revert to their respective pre-automation operational states, based on the information associated with the pre-automation operational states stored in the vehicle memory. In this manner, the vehicle 102 enhances user's convenience of executing the vehicle's automation modes, as the user 104 is not required to manually revert operational states/settings of vehicle components every time the user 104 deactivates an automation mode (as is the case with conventional systems/vehicles).

In a second example scenario, when the user 104 activates a new automation mode (e.g., the reading mode 110) when a previous automation mode (e.g., the cinema mode 108) is already being executed or when the first set of vehicle components are already operating in the first optimal operational states, the vehicle 102 may first determine a second set of vehicle components associated with the reading mode 110 whose operational states are required to be adjusted, and their respective second optimal operational states. The vehicle 102 may then cause the second set of vehicle components to operate based on the respective second optimal operational states. For example, as described above, in this case, the vehicle 102 may automatically cause vehicle's interior lights to illuminate in purple color, vehicle's sitting area on which the user 104 is sitting to tilt up, vehicle's top portion window to turn to vent, and/or the like.

Further, in the second example scenario described above, the vehicle 102 may cause those vehicle components that are common between the first set of vehicle components and the second set of vehicle components to operate based on their respective second optimal operational states, when the user 104 selects to execute or activates the reading mode 110. On the other hand, the vehicle 102 may cause those vehicle components that are part of the first set of vehicle components but not part of the second set of vehicle components (e.g., the vehicle fan) to operate based on their respective pre-automation operational states, when the user 104 activates the reading mode 110. Stated another way, the vehicle 102 may cause those vehicle components that are part of the first set of vehicle components but not part of the second set of vehicle components to go back or revert to their respective pre-automation operational states, when the user 104 activates the reading mode 110.

The vehicle 102 may further automatically cause the operational states associated with the second set of vehicle components to go back or revert to their respective pre-automation operational states, when the user 104 deactivates the reading mode 110 or switches OFF the vehicle's automation mode, in the same manner as described above.

The vehicle 102 may be further configured to control or adjust operational states of one or more vehicle components when an automation mode is being executed and/or when the automation mode is deactivated based on user preferences or inputs. Such additional vehicle details are described below in conjunction with FIG. 2.

The vehicle 102 and/or the user 104 implement and/or perform operations, as described here in the present disclosure, in accordance with the owner manual and safety guidelines. In addition, any action taken by the user 104 based on the notifications/recommendations provided by the vehicle 102 should comply with all the rules specific to the location and operation of the vehicle 102 (e.g., Federal, state, country, city, etc.). The notifications/recommendations, as provided by the vehicle 102, should be treated as suggestions and only followed according to any rules specific to the location and operation of the vehicle 102.

FIG. 2 depicts a block diagram of a system 200 to control vehicle component operation on activation and deactivation of an automation mode in accordance with the present disclosure. While describing FIG. 2, references will be made to FIG. 3.

The system 200 may include the vehicle 102, a user device 202 and one or more servers 204 (or a server 204) communicatively coupled with each other via one or more networks 206. In some aspects, the user device 202 may be associated with the user 104, and may be, for example, a mobile phone, a laptop, a tablet, a smartwatch, or any other device having communication capability. The server 204 may be part of a cloud-based computing infrastructure and may be associated with and/or include a Telematics Service Delivery Network (SDN) that provides digital data services to the vehicle 102 and other vehicles (not shown in FIG. 2) that may be part of a vehicle fleet. In some aspects, the server 204 may be part of the vehicle 102. In other aspects, the server 204 may be outside the vehicle 102 (as shown in FIG. 2).

In further aspects, the server 204 may store a mapping of a plurality of sets of vehicle components to be adjusted with a plurality of automation modes. For example, the server 204 may store a mapping that indicates that the operational states associated with the first set of vehicle components should be adjusted when the cinema mode 108 is activated in the vehicle 102, the operational states associated with the second set of vehicle components should be adjusted when the reading mode 110 is activated, and so on. The first and second sets of vehicle components may or may not have common vehicle components. The server 204 may further store operational state information associated with an optimal operational state of each vehicle component, from the plurality of sets of vehicle components described above, for each automation mode from the plurality of automation modes. For example, the server 204 may store the operational state information that indicates the first optimal operational states in which the first set of vehicle components should operate when the cinema mode 108 is activated in the vehicle 102, the second optimal operational states in which the second set of vehicle components should operate when the reading mode 110 is activated, and so on. The examples of the first and second sets of vehicle components, and the first and second optimal operational states are described above in conjunction with FIG. 1.

In some aspects, the vehicle manufacturer and/or the user 104 may set and/or adjust/customize the mapping and/or the operational state information. Further, the server 204 may transmit the mapping and/or the operational state information to the vehicle 102 at a predefined frequency, or when the vehicle 102 transmits a request to the server 204 to obtain such information.

The network(s) 206 illustrates an example communication infrastructure in which the connected devices discussed in various embodiments of this disclosure may communicate. The network(s) 206 may be and/or include the Internet, a private network, public network or other configuration that operates using any one or more known communication protocols such as transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of units including, but not limited to, an automotive computer 208, a Vehicle Control Unit (VCU) 210, and an automation mode unit 212 (or unit 212). The VCU 210 may include a plurality of Electronic Control Units (ECUs) 214 in communication with the automotive computer 208.

In some aspects, the automotive computer 208 and/or the unit 212 may be installed anywhere in the vehicle 102, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be in communication with one or more memory devices in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable medium or memory storing a vehicle automation mode program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle 102 systems, connected servers (e.g., the server(s) 204), and other vehicles (not shown in FIG. 2) operating as part of a vehicle fleet. The VCU 210 may include or communicate with any combination of the ECUs 214, such as a Body Control Module (BCM) 220, an Engine Control Module (ECM) 222, a Transmission Control Module (TCM) 224, a Telematics Control Unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a radio detection and ranging (radar) sensor configured for detection and localization of objects inside and outside the vehicle 102 using radio waves, sitting area buckle sensors, sitting area sensors, a light detecting and ranging (lidar) sensor, door sensors, proximity sensors, temperature sensors, wheel sensors, ambient weather sensors, vehicle internal and external cameras, one or more rain sensors, capacitive moisture sensors, a tire pressure sensor, ultrasonic sensors, etc.

In some aspects, the VCU 210 may control vehicle operational aspects and implement one or more instruction sets received from the user device 202, from one or more instruction sets stored in the memory 218, including instructions operational as part of the unit 212.

The TCU 226 may be configured and/or programmed to provide vehicle connectivity to wireless computing systems onboard and off board the vehicle 102 and may include a Navigation (NAV) receiver 234 for receiving and processing a GPS signal, a BLE Module (BLEM) 236, a Wi-Fi transceiver, a UWB transceiver, and/or other wireless transceivers (not shown in FIG. 2) that may be configurable for wireless communication (including cellular communication) between the vehicle 102 and other systems (e.g., the user device 202, a key fob, etc.), computers, and modules. The TCU 226 may be in communication with the ECUs 214 by way of a bus.

The ECUs 214 may control aspects of vehicle operation and communication using inputs from human drivers, inputs from an autonomous vehicle controller, the unit 212, and/or via wireless signal inputs received via the wireless connection(s) from other connected devices, such as the user device 202, the server(s) 204, among others.

The BCM 220 generally includes integration of sensors, vehicle performance indicators, and variable reactors associated with vehicle systems and may include processor-based power distribution circuitry that can control functions associated with the vehicle body such as lights, windows, security, camera(s), fan, headlights, audio system(s), speakers, wipers, door locks and access control, and various comfort controls. The BCM 220 may also operate as a gateway for bus and network interfaces to interact with remote ECUs (not shown in FIG. 2). In some aspects, the BCM 220 may be configured to adjust the operational states of one or more vehicle components when an automation mode is activated/executed in the vehicle 102, based on inputs or command signals obtained from the user device 202, the key fob, the processor 216, the unit 212, and/or the like.

The DAT controller 228 may provide Level-1 through Level-3 automated driving and driver assistance functionality that may include, for example, active parking assistance, vehicle backup assistance, and adaptive cruise control, among other features. The DAT controller 228 may also provide aspects of user and environmental inputs usable for user authentication.

In some aspects, the automotive computer 208 may connect with the HMI 106 or an infotainment system 106 (hereinafter referred to as infotainment system 106). The infotainment system 106 may include a touchscreen interface portion and may include voice recognition features, biometric identification capabilities that can identify users based on facial recognition, voice recognition, fingerprint identification, or other biological identification means. In other aspects, the infotainment system 106 may be further configured to receive user instructions / inputs via the touchscreen interface portion and/or display notifications/ recommendations, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered limiting or exclusive.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 238, a processor 240, and a computer-readable memory 242.

The transceiver 238 may be configured to receive information/inputs from one or more external devices or systems, e.g., the user device 202, the server(s) 204, and/or the like via the network 206. For example, the transceiver 238 may receive the mapping and the operational state information described above from the user device 202 and/or the server 204 via the network 206. Further, the transceiver 238 may transmit notifications (e.g., alert/alarm signals) to the external devices or systems. In addition, the transceiver 238 may be configured to receive information/inputs from vehicle 102 components such as the infotainment system 106, the vehicle sensory system 232, the TCU 226, and/or the like. Further, the transceiver 238 may transmit notifications (e.g., alert/alarm/command signals) to the vehicle 102 components such as the infotainment system 106, the BCM 220, etc.

The processor 240 and the memory 242 may be the same as or similar to the processor 216 and the memory 218, respectively. In some aspects, the processor 240 may utilize the memory 242 to store programs in code and/or to store data for performing aspects in accordance with the disclosure. The memory 242 may be a non-transitory computer-readable medium or memory storing the vehicle automation mode program code. In some aspects, the memory 242 may be configured to store the mapping and the operational state information described above that the vehicle 102 obtains from the server 204, the user device 202, and/or the like. In additional or alternative aspects, the vehicle 102 (and hence the memory 242) may obtain the mapping and the operational state information directly from the user 104 and/or the vehicle manufacturer via the infotainment system 106.

In operation, when the user 104 desires to activate an automation mode (e.g., a "first automation mode" or the cinema mode 108) in the vehicle 102, the user 104/system may select the cinema mode 108 option on the infotainment system 106 and/or the user device 202. Responsive to the user 104/system selecting the cinema mode 108, the transceiver 238 may receive a first trigger signal from the infotainment system 106 and/or the user device 202 (or the VCU 210). In some aspects, the first trigger signal may be associated with a request to activate or execute the cinema mode 108 (or the "first automation mode" of a plurality of automation modes) in the vehicle 102.

The transceiver 238 may transmit the first trigger signal to the processor 240. Responsive to obtaining the first trigger signal, the processor 240 may first determine pre-automation operational states associated with a plurality of vehicle components, based on inputs obtained from the VCU 210. As described above in conjunction with FIG. 1, the pre-automation operational states may indicate or may be the operational states associated with the plurality of vehicle components when no automation mode is being executed in the vehicle 102. Stated another way, the pre-automation operational states may indicate or include the current operational states associated with the plurality of vehicle components when the cinema mode 108 is not yet initiated or executed in the vehicle 102, or when the vehicle components associated with the cinema mode 108 are not yet operating in their respective optimal operational states associated with the cinema mode 108.

Figure 3:
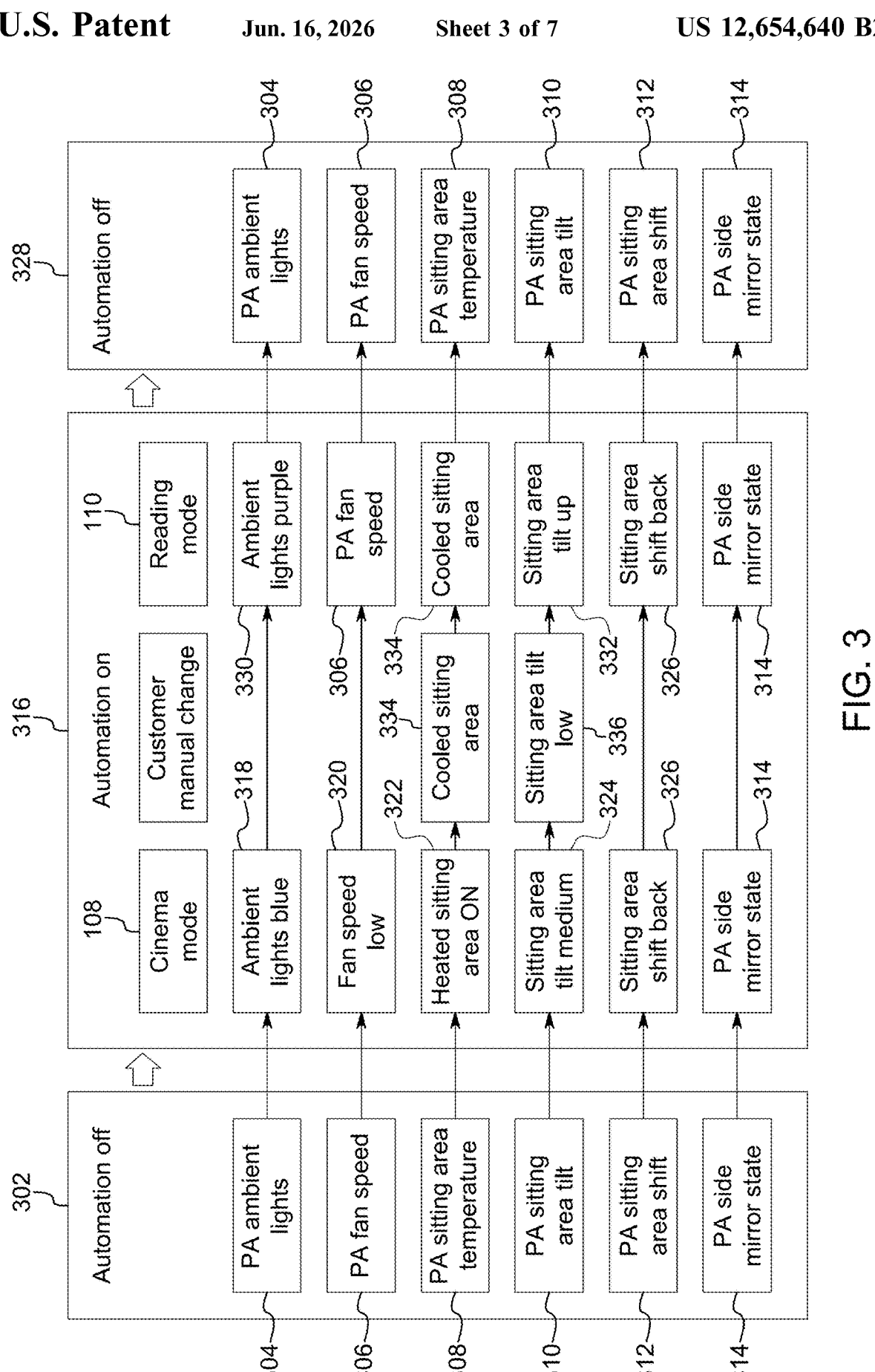
FIG. 3 depicts an example sequence flow diagram showing transition of vehicle component operational states in accordance with the present disclosure.

An example view of pre-automation operational states of a plurality of vehicle components is shown in a column 302 of FIG. 3. The column 302 depicts operational states associated with the vehicle components when no automation is being executed in the vehicle 102 or when automation is OFF. As shown in the column 302, the vehicle's interior or ambient lights may have a pre-automation (PA) operational state of PA ambient lights 304, the fan may a pre-automation operational state/speed of PA fan speed 306, the vehicle's sitting areas may have a pre-automation operational state/ temperature of PA sitting area temperature 308, the vehicle's sitting areas may further have a pre-automation operational state/tilt angle of PA sitting area tilt 310, the vehicle's sitting areas may further have a pre-automation operational state/ shift of PA sitting area shift 312, the side mirrors may further have a pre-automation operational state of PA side mirror state 314, and/or the like. Responsive to determining the pre-automation operational states as described above, the processor 240 may store the information associated with the pre-automation operational states in the memory 242.

The processor 240 may further fetch the mapping and the operational state information from the memory 242, responsive to obtaining the first trigger signal. The processor 240 may then determine the first set of vehicle components associated with the cinema mode 108 whose operational states are required to be updated, based on the mapping. For example, the processor 240 may determine that the operational states associated with the ambient lights, the fan, the sitting area temperature, the sitting area tilt and the sitting area shift (collectively referred to as the first set of vehicle components) is required to be updated based on the mapping, as these vehicle components may be associated with the cinema mode 108. The processor 240 may additionally determine the first optimal operational states associated with the first set of vehicle components in which these vehicle components should operate in the cinema mode 108, based on the operational state information.

Responsive to determining the first set of vehicle components and the first optimal operational states as described above, the processor 240 may cause, via the BCM 220, the first set of vehicle components to operate in the respective first optimal operational states. For example, as shown in a column 316 of FIG. 3, when the cinema mode 108 is activated/executed in the vehicle 102 (i.e., when the processor 240 obtains the first trigger signal), the processor 240 may cause the ambient lights to turn blue (shown as a block 318 in FIG. 3), the fan speed to turn low (shown as a block 320), the sitting areas to get heated (shown as a block 322), the sitting areas to tilt to medium (shown as a block 324), and the sitting area to shift back (shown as a block 326). In some aspects, since the side mirrors are not part of the first set of vehicle components, the processor 240 may not cause any change in the side mirrors' operational state, as shown in FIG. 3. Stated another way, the side mirrors may have the same operational state as their pre-automation operational state, when the cinema mode 108 is executed.

In some aspects, the column 316 may indicate the operational states associated with the plurality of vehicles when at least one automation mode (e.g., the cinema mode 108) may be getting executed in the vehicle 102.

Further, when the user 104 desires to deactivate or switch OFF the automation mode (e.g., the cinema mode 108) that may be getting executed in the vehicle 102, the user 104 may transmit another trigger signal (e.g., an automation mode deactivation request or a "second trigger signal") to the transceiver 238 via the user device 202 and/or the infotainment system 106. In an exemplary aspect, the second trigger signal may be associated with a request to deactivate or switch OFF the first automation mode/cinema mode 108.

The transceiver 238 may receive the second trigger signal from the user device 202 and/or the infotainment system 106, and may transmit the second trigger signal to the processor 240. Responsive to obtaining the second trigger signal, the processor 240 may fetch the information associated with the pre-automation operational states from the memory 242. The processor 240 may further cause the BCM 220 to automatically restore the operational states associated with the first set of vehicle components back to their respective pre-automation operational states based on the fetched information, as shown in a column 328 of FIG. 3. In some aspects, the column 328 indicates the operational states associated with the plurality of vehicle components when no automation mode is being executed in the vehicle 102 or when the automation mode is switched OFF. As apparent from FIG. 3, the columns 302 and 328 indicate same operational states associated with the plurality of vehicle components.

In this manner, the processor 240 enables the vehicle components to automatically return to their pre-automation operational states when the user 104 deactivates the automation mode in the vehicle 102, thereby saving the user's effort in manually restoring (or pre-programming) the vehicle components' settings every time the user 104 deactivates the automation mode or requiring to run additional reverting automations. Such automatic restoration of vehicle component operational states considerably enhances user's convenience operating the vehicle 102 (specifically, operating the automation modes in the vehicle 102). A person ordinarily skilled in the art may appreciate from the description above that the present disclosure saves manual effort and mental load in trying to create (and maintain) an automation that knows every single one of the user's preferred settings every time the user 104 changes something in the vehicle 102, which would need an update; whereas, the present disclosure handles all of that automatically.

Although the description above describes an aspect where the user 104 deactivates the first automation mode/cinema mode 108, thereby causing the first set of vehicle components to go back or revert to their pre-automation operational states, the present disclosure is not limited to such an aspect. In alternative aspects, instead of deactivating the first automation mode/cinema mode 108, the user 104 may activate a new automation mode (e.g., a second automation mode or the reading mode 110) while the vehicle 102 may already be executing the first automation mode/cinema mode 108. Stated another way, in alternative aspects, the user 104 may activate the second automation mode or the reading mode 110 while the first set of vehicle components may be operating in the first optimal operational states.

In this case, to cause the vehicle 102 to activate/execute the reading mode 110, the user 104 may transmit another trigger signal (or a "third trigger signal") to the transceiver 238 via the user device 202 and/or the infotainment system 106. The transceiver 238 may receive the third trigger signal from the user device 202 and/or the infotainment system 106, and transmit the third trigger signal to the processor 240. In an exemplary aspect, the transceiver 238 may receive the third trigger signal after receiving the first trigger signal (i.e., after the cinema mode 108 is activated) and before receiving the second trigger signal (i.e., before the user 104 transmit the automation mode deactivation request to the vehicle 102). The third trigger signal may be associated with a request to activate the second automation mode/ reading mode 110, which may be different from the first automation mode/cinema mode 108 that may already be getting executed in the vehicle 102.

Responsive to obtaining the third trigger signal, the processor 240 may determine the second set of vehicle components associated with the reading mode 110 whose operational states should get updated when the reading mode 110 is activated, based on the mapping fetched from the memory 242. For example, the processor 240 may determine that the operational states associated with the ambient lights, sitting area tilt, and the sitting area shift should get updated when the reading mode 110 is activated. The processor 240 may further determine the second optimal operational states associated with the determined second set of vehicle components in which the second set of vehicle components should operate when the reading mode 110 is activated, based on the operational state information fetched from the memory 242. The processor 240 may further cause, via the BCM 220, the second set of vehicle components to operate in the second optimal operational states, responsive to obtaining the third trigger signal.

For example, as shown in the column 316, the processor 240 may cause the ambient lights to turn purple (shown as a block 330), tilt up the sitting areas (shown as a block 332), and shift back the sitting area (shown as the block 326), when the reading mode 110 is activated. Since the sitting area was already shifted back in the cinema mode 108, the processor 240 may not be required to change the sitting area shift while executing the reading mode 110, as shown in the block 326 of FIG. 3.

In further aspects, responsive to obtaining the third trigger signal, the processor 240 may determine one or more vehicle components (e.g., "third vehicle components") that are part of the first set of vehicle components (i.e., the vehicle components associated with the cinema mode 108) but are not part of the second set of vehicle components (i.e., the vehicle components associated with the reading mode 110). An example of such a third vehicle component or feature is the fan or fan speed. Responsive to determining that the fan is part of the first set of vehicle components but not the part of the second set of vehicle components, the processor 240 may restore the operational state/speed associated with the fan/third vehicle component back to its respective pre-automation operational state/speed as shown by the PA fan speed block 306 in the column 316.

The processor 240 may further keep/retain the operational states of those vehicle components that are neither part of the first set of vehicle components nor the second set of vehicle components as the pre-automation operational states. An example of such a vehicle component is the vehicle's side mirror. As shown in FIG. 3, the operational state associated with the side mirrors (shown as PA side mirror state 314) stays the same as its pre-automation operational state when the vehicle 102 is executing the cinema mode 108, and then the reading mode 110.

In further aspects, the vehicle 102 may enable the user 104 to provide user inputs associated with the user's preference of an operational state of a vehicle component, when the vehicle 102 may already be executing an automation mode. In this case, as an example, when the vehicle 102 may already be executing the first automation mode/cinema mode 108 (i.e., after the transceiver 238/processor 240 obtains the first trigger signal), the user 104 may transmit the user inputs associated with preferred operational states of one or more vehicle component (e.g., "fourth vehicle components") to the vehicle 102/transceiver 238 via the user device 202 and/or the infotainment system 106. For example, the user 104 may transmit the user inputs to the transceiver 238 that indicate that the sitting area temperature should be cooled down, and the sitting area tilt should be lowered.

The transceiver 238 may receive the user inputs from the user device 202 and/or the infotainment system 106, and transmit the user inputs to the processor 240. Responsive to obtaining the user inputs, the processor 240 may cause, via the BCM 220, the fourth vehicle components (e.g., the sitting area temperature and the sitting area tilt) to operate in the preferred operational states indicated in the user inputs. For example, responsive to obtaining the user inputs, the processor 240 may cool down the sitting area temperature (shown as a block 334 in FIG. 3) and lower the sitting area tilt (shown as a block 336), as indicated in the user inputs.

In the exemplary aspect described above, when the user 104 activates the second automation mode/reading mode 110 (i.e., when the processor 240 obtains the third trigger signal), the processor 240 may first check whether the fourth vehicle components (i.e., the sitting area temperature and the sitting area tilt) are part of the second set of vehicle components. When the fourth vehicle component (e.g., the sitting area tilt) is part of the second set of vehicle components, the processor 240 may cause the fourth vehicle component/sitting area tilt to operate based on or in the respective second optimal operational state associated with the fourth vehicle component/sitting area tilt. For example, as shown by the block 332 in FIG. 3, when the sitting area tilt is part of the second set of vehicle components, the processor 240 may cause the sitting area tilt to adjust as per its second optimal operational state, when the processor 240 activates/executes the reading mode 110 or obtains the third trigger signal.

On the other hand, when the fourth vehicle component (e.g., the sitting area temperature) is not part of the second set of vehicle components, the processor 240 may cause the fourth vehicle component/sitting area temperature to continue to operate in the preferred operational state desired by the user 104 (and indicated in the user inputs), even after the processor 240 activates/executes the reading mode 110 or obtains the third trigger signal. For example, as shown by the block 334 in FIG. 3, when the sitting area temperature is not part of the second set of vehicle components, the processor 240 may cause the sitting area temperature to stay cooled, when the processor 240 activates/executes the reading mode 110 or obtains the third trigger signal.

In further aspects, when the user 104 desires to deactivate/switch OFF the vehicle's automation mode or the second automation mode/reading mode 110, the user 104 may transmit the second trigger signal to the transceiver 238 via the user device 202 or the infotainment system 106, as described above. In this case, the second trigger signal may be associated with a request to deactivate/switch OFF the second automation mode/reading mode 110.

As described above, the transceiver 238 may receive the second trigger signal, and transmit the second trigger signal to the processor 240. Responsive to obtaining the second trigger signal, the processor 240 may restore operational states associated with the second set of vehicle components back to their respective pre-automation operational states, as shown in the column 328.

In one exemplary aspect, the processor 240 may additionally cause the fourth vehicle component (e.g., the sitting area temperature) to transition from the preferred operational state to its pre-automation operational state responsive to obtaining the second trigger signal, as shown by the PA sitting area temperature block 308 in the column 328.

In another exemplary aspect, when the user inputs further include an indication of a user preference to cause the fourth vehicle component (e.g., the sitting area temperature) to continue operation in the preferred operational state even after obtaining the second trigger signal or even after the user 104 transmits the request to deactivate the vehicle's automation mode, the processor 240 may cause the fourth vehicle component to continue to operate in the preferred operational state even after the reading mode 110 is deactivated. Stated another way, in this case, the processor 240 may not cause the operational state associated with the fourth vehicle component/the sitting area temperature to go back or revert to its pre-automation operational state, when the user inputs indicate that the user 104 desires the fourth vehicle component/the sitting area temperature to continue operation in the same preferred mode even after the vehicle's automation mode is switched OFF.

In yet another aspect, the user inputs received/obtained by the transceiver 238/processor 240 may further include user preferences for default operational states of one or more vehicle components. The user 104 may provide these user inputs any time before or during the operation of an automation mode. In this case, when the user inputs include the user preferences for default operational states, the processor 240 may cause the vehicle components indicated in the user inputs to operate in the default operational states when the processor 240 deactivates the vehicle's automation mode/ second automation mode (or when the processor 240 obtains the second trigger signal). For example, when the user inputs include a user preference indicating that the vehicle's ambient lights should be switched OFF when the vehicle's automation mode is deactivated, the processor 240 may cause, via the BCM 220, the ambient lights to switch OFF when the processor 240 deactivates the vehicle's automation mode/second automation mode (or when the processor 240 obtains the second trigger signal).

In this manner, the processor 240 not only reverts the operational states associated with the plurality of vehicle components to their respective pre-automation operational states after the vehicle's automation mode is deactivated, but also causes one or more vehicle components to operate in user's preferred operational states or default operational states after the vehicle's automation mode is deactivated, as per user's desires/requirements.

Figure 4:
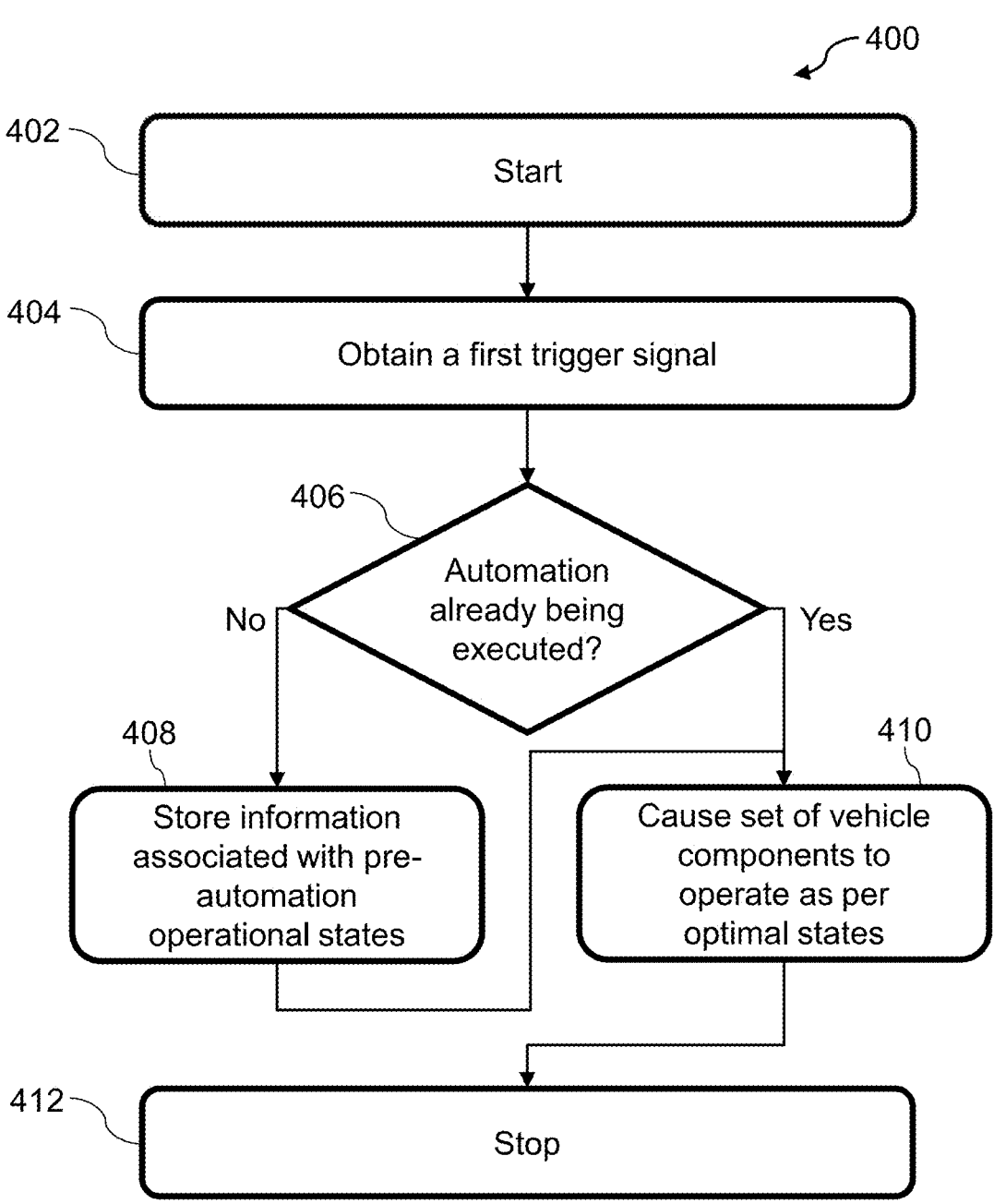
FIG. 4 depicts a flow diagram of an example first method to control vehicle component operation in accordance with the present disclosure.

FIG. 4 depicts a flow diagram of an example first method 400 to control vehicle component operation in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include obtaining, by the processor 240, the first trigger signal or the request to activate an automation mode (e.g., the first automation mode/cinema mode 108). At step 406, the method 400 may include determining, by the processor 240, whether an existing automation mode is already being executed in the vehicle 102, responsive to obtaining the first trigger signal.

At step 408, the method 400 may include storing, by the processor 240, the information associated with the pre-automation operational states of the plurality of vehicle components in the memory 242, responsive to determining at the step 406 that no existing automation is being executed in the vehicle 102. The method 400 moves to step 410 after the step 408.

At the step 410, the method 400 may include causing, by the processor 240, the first or second sets of vehicle components to operate based on their respective first or second optimal operational states, as described above in conjunction with FIG. 2.

The method 400 may end at step 412.

Figure 5:
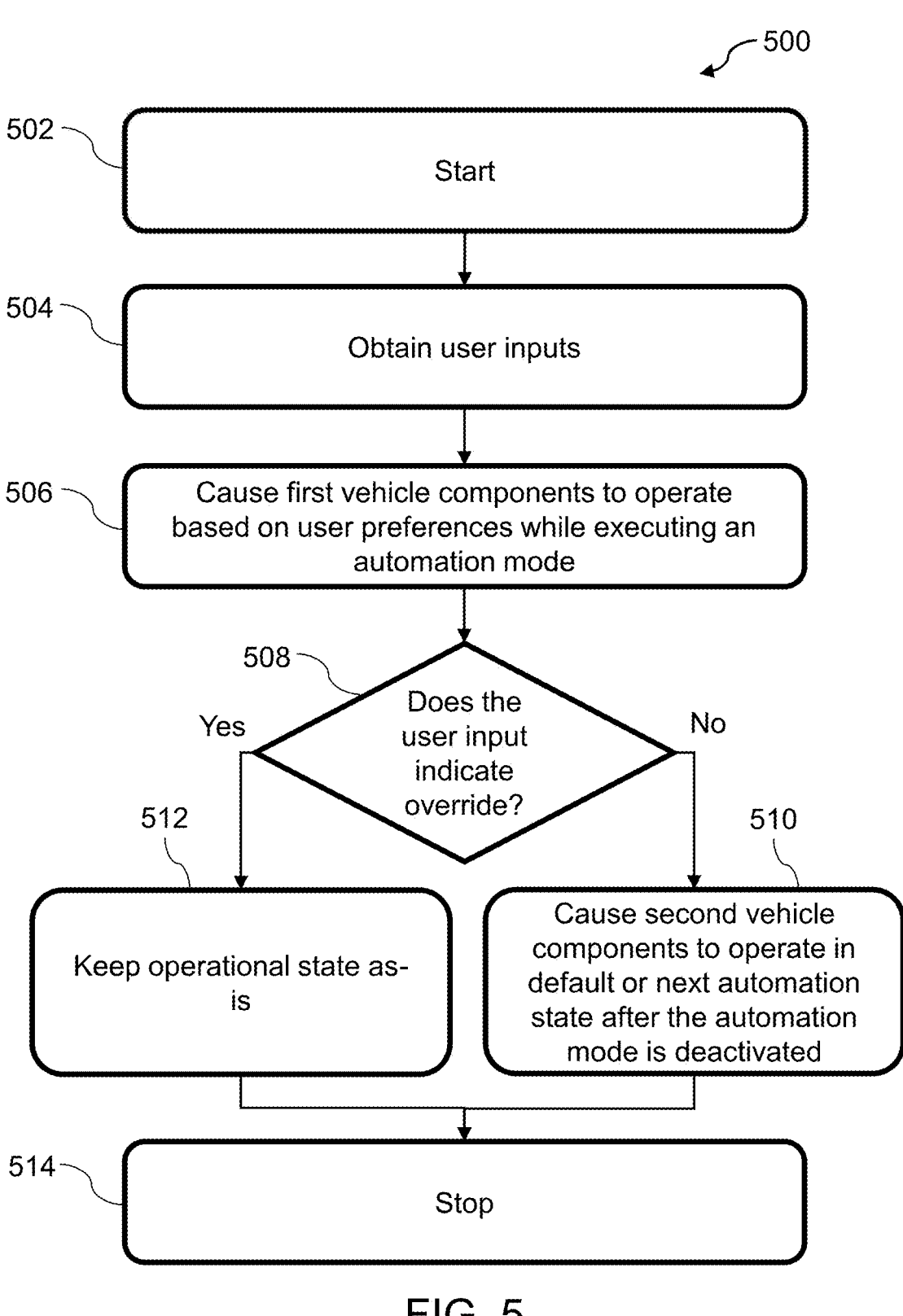
FIG. 5 depicts a flow diagram of an example second method to control vehicle component operation in accordance with the present disclosure.

FIG. 5 depicts a flow diagram of an example second method 500 to control vehicle component operation in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include obtaining, by the processor 240, the user inputs indicating one or more vehicle components (e.g., "first vehicle components") that should operate as per user preferences when an automation mode is being executed in the vehicle 102, and one or more vehicle components (e.g., "second vehicle components") that should operate in a default mode when the automation mode is deactivated.

At step 506, the method 500 may include causing, by the processor 240, the first vehicle components to operate as per the user preferences when the vehicle 102 is executing an automation mode. At step 508, the method 500 may include determining, by the processor 240, whether the user inputs indicate that the user 104 prefers to override the next automation's actions or default states while deactivating the automation state. At step 510, the method 500 may include causing, by the processor 240, the second vehicle components to operate in the default mode when the vehicle 102 stops executing the automation mode or when the automation mode is deactivated, and when the user inputs does not indicate the override. On the other hand, the processor 240 may keep the operational states of the vehicle components as-is after deactivating the automation mode at step 512, when the user inputs indicate the override.

The method 500 may end at step 514.

Figure 6:
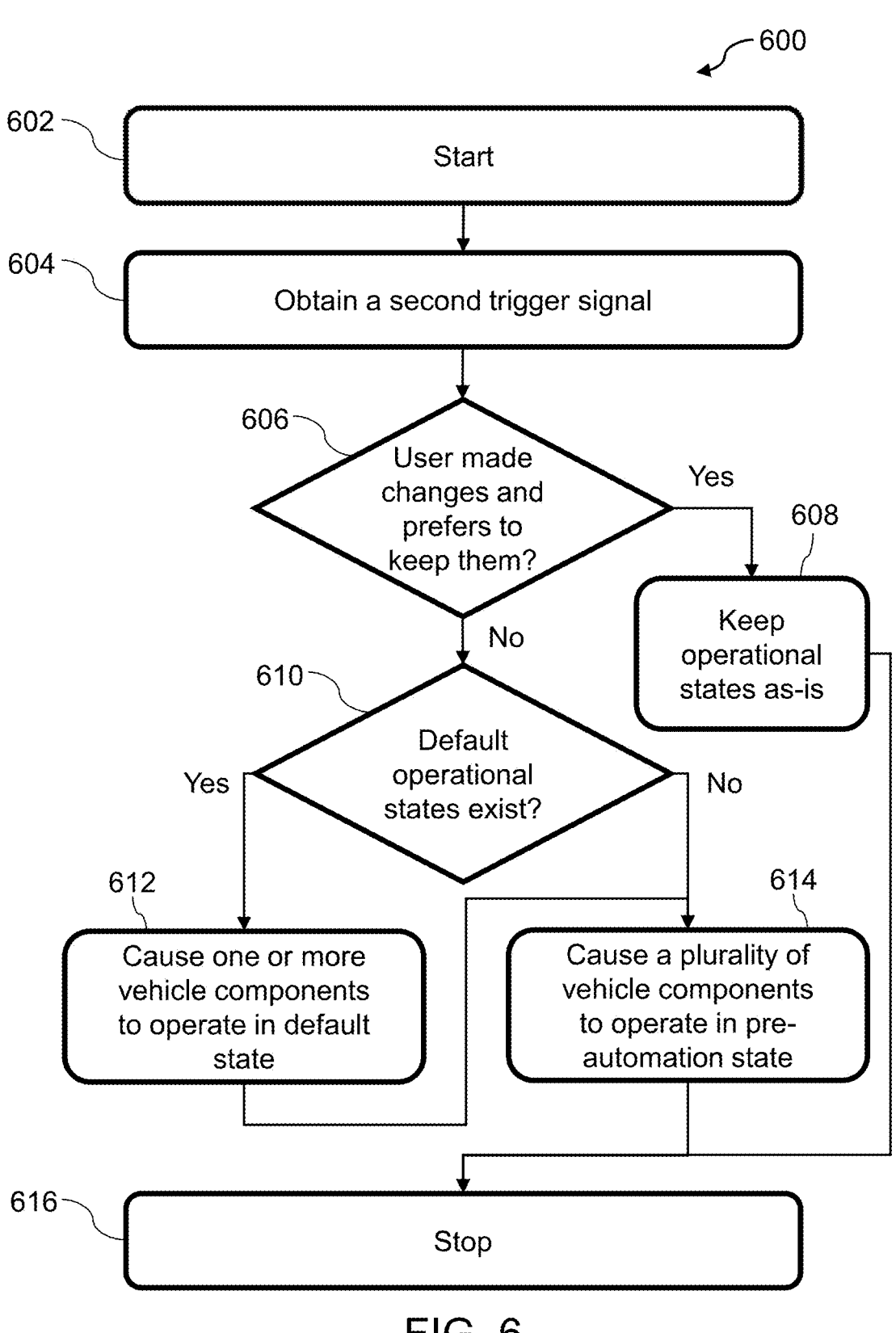
FIG. 6 depicts a flow diagram of an example third method to control vehicle component operation in accordance with the present disclosure.

FIG. 6 depicts a flow diagram of an example third method 600 to control vehicle component operation in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 600 starts at step 602. At step 604, the method 600 may include obtaining, by the processor 240, the second trigger signal to deactivate the vehicle's automation mode. At step 606, the method 600 may include determining, by the processor 240, whether the user 104 made changes to operational states of one or more vehicle components, and whether the user 104 desires to preclude default or revert actions for such vehicle components. At step 608, the method 600 may include keeping, by the processor 240, the operational states of the vehicle components as-is, when the user 104 made changes to the operational states and desires to preclude the default or revert actions.

On the other hand, responsive to determining that the user 104 did not make any changes and/or does not desire to preclude the default or revert actions, the method 600 may move to step 610. At the step 610, the method 600 may include determining, by the processor 240, whether the user 104 prefers default operational states of one or more vehicle components after the vehicle's automation mode is deactivated.

At step 612, the method 600 may include causing, by the processor 240, one or more vehicle components to operate in their respective default operational states, responsive to determining at the step 610 that the user 104 prefers the default operational states. At step 614, the method 600 may include causing, by the processor 240, the plurality of (remaining) vehicle components to operate in their respective pre-automation operational state.

The method 600 may end at step 616.

Figure 7:
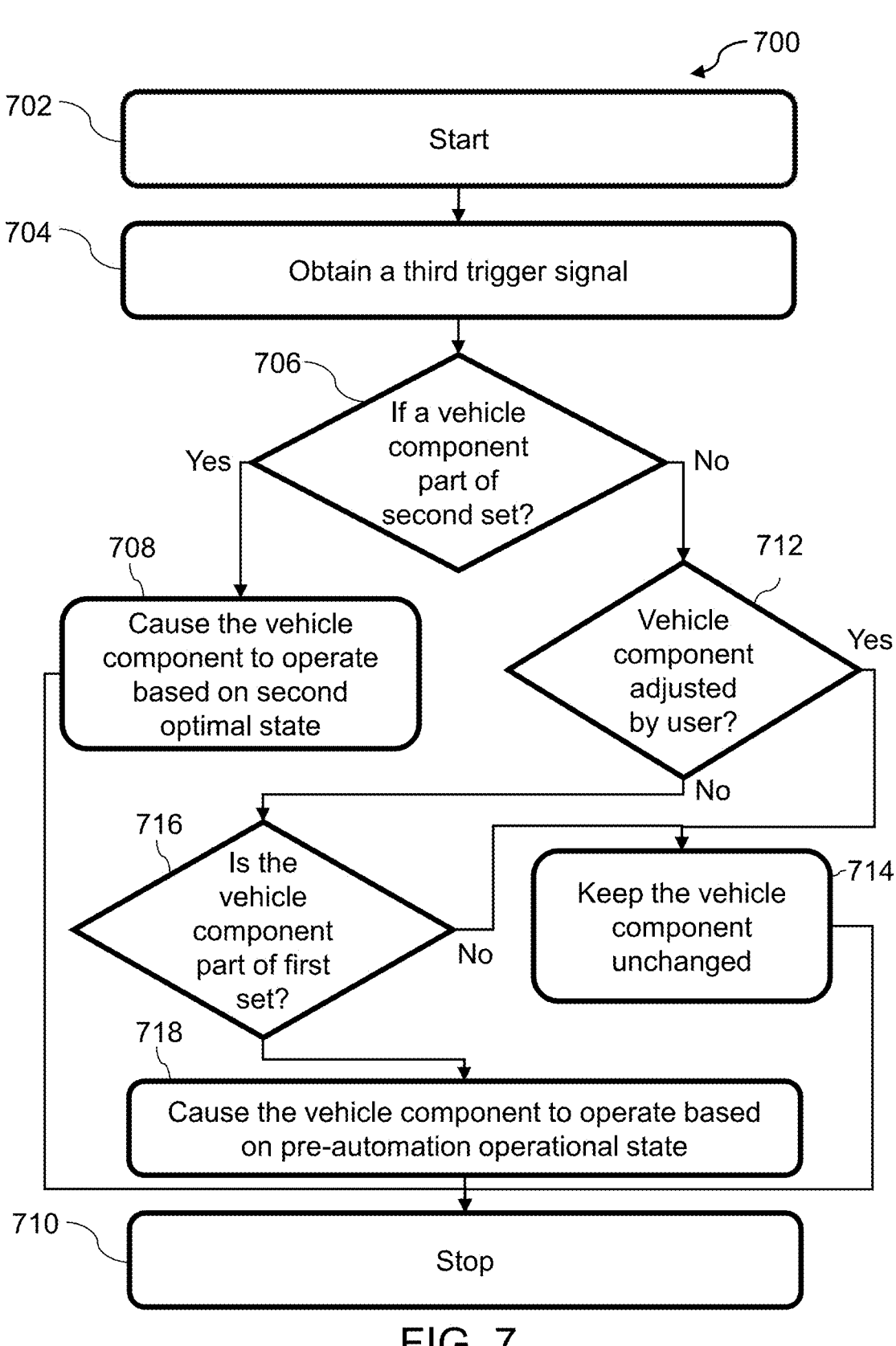
FIG. 7 depicts a flow diagram of an example fourth method to control vehicle component operation in accordance with the present disclosure.

FIG. 7 depicts a flow diagram of an example fourth method 700 to control vehicle component operation in accordance with the present disclosure. FIG. 7 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 700 starts at step 702. At step 704, the method 700 may include obtaining, by the processor 240, the third trigger signal to activate the second automation mode (e.g., the reading mode 110) when the first automation mode (e.g., the cinema mode 108) may already be getting executed in the vehicle 102. At step 706, the method 700 may include determining, by the processor 240, for each vehicle component, whether the vehicle component is part of the second set of vehicle components.

At step 708, the method 700 may include causing, by the processor 240, the vehicle component to operate in the respective second optimal operational state, when the processor 240 determines at the step 706 that the vehicle component is part of the second set of vehicle components. The method 700 moves to step 710 after the step 708, at which the method 700 ends.

On the other hand, responsive to determining that the vehicle component is not part of the second set of vehicle components at the step 706, the processor 240 may determine whether the vehicle component is adjusted by the user 104 at step 712. At step 714, the method 700 may include keeping, by the processor 240, the vehicle component's operational state unchanged, when the processor 240 determines at the step 712 that the user 104 has adjusted the vehicle component. The method 700 moves to the step 710 after the step 714.

On the other hand, responsive to determining that the user 104 did not adjust the vehicle component at the step 712, the processor 240 may determine whether the vehicle component is part of the first set of vehicle components at step 716. At step 718, the method 700 may include causing, by the processor 240, the vehicle component to operate in its pre-automation operational state, when the processor 240 determines at the step 716 that the vehicle component is part of the first set of vehicle components. The method 700 may move to the step 710 after the step 718.

On the other hand, when the processor 240 determines that the vehicle component is not part of the first set of vehicle components at the step 716, the method 700 may move to the step 714, at which the vehicle component's operational state may be kept unchanged by the processor 240.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a transceiver configured to receive:

a first trigger signal associated with a request to activate a first automation mode of a plurality of automation modes;

a second trigger signal; and a third trigger signal associated with a request to activate a second automation mode of the plurality of automation modes, wherein the second automation mode is different from the first automation mode;

a memory; and a processor configured to:

determine, responsive to obtaining the first trigger signal, pre-automation operational states associated with a plurality of vehicle components of the vehicle and first optimal operational states associated with a first set of vehicle components of the plurality of vehicle components, wherein the first set of vehicle components is associated with the first automation mode;

store an information associated with the pre-automation operational states in the memory;

cause the first set of vehicle components to operate based on the first optimal operational states;

determine, responsive to obtaining the third trigger signal, second optimal operational states associated with a second set of vehicle components of the plurality of vehicle components, wherein the second set of vehicle components is associated with the second automation mode;

cause the second set of vehicle components to operate based on the second optimal operational states;

determine, responsive to obtaining the third trigger signal, a third set of vehicle components of the plurality of vehicle components comprising one or more vehicle components that are part of the first set of vehicle components and not part of the second set of vehicle components; and restore, responsive to obtaining the third trigger signal, operational states associated with the third set of vehicle components back to respective pre-automation operational states associated with the third set of vehicle components.

2. The vehicle of claim 1, wherein the memory is further configured to store:

a mapping of a plurality of sets of vehicle components to be adjusted with the plurality of automation modes; and an operational state information associated with an optimal operational state of each vehicle component, of the plurality of sets of vehicle components, for each automation mode of the plurality of automation modes.

3. The vehicle of claim 2, wherein the processor is further configured to:

fetch, responsive to obtaining the first trigger signal, the mapping and the operational state information from the memory;

determine the first set of vehicle components based on the mapping; and determine the first optimal operational states associated with the first set of vehicle components based on the operational state information.

4. The vehicle of claim 1, wherein the processor is further configured to restore, responsive to obtaining the second trigger signal, operational states associated with the first set of vehicle components back to respective pre-automation operational states associated with the first set of vehicle components based on the information associated with the pre-automation operational states.

5. The vehicle of claim 2, wherein the processor is further configured to:

fetch, responsive to obtaining the third trigger signal, the mapping and the operational state information from the memory;

determine the second set of vehicle components based on the mapping; and determine the second optimal operational states based on the operational state information.

6. The vehicle of claim 5, wherein the processor is further configured to:

determine the third set of vehicle components based on the mapping.

7. The vehicle of claim 1, wherein the second trigger signal is associated with a request to deactivate the second automation mode, and wherein the processor is further configured to:

restore, responsive to obtaining the second trigger signal, operational states associated with the second set of vehicle components back to respective pre-automation operational states associated with the second set of vehicle components.

8. The vehicle of claim 1, wherein the transceiver is further configured to receive user inputs associated with a preferred operational state of a fourth set of vehicle components of the plurality of vehicle components, after receiving the first trigger signal, and wherein the processor is further configured to:

cause, responsive to obtaining the user inputs, the fourth set of vehicle components to operate in the preferred operational state.

9. The vehicle of claim 8, wherein the processor is further configured to:

determine, responsive to obtaining the third trigger signal, that the fourth set of vehicle components is part of the second set of vehicle components; and cause the fourth set of vehicle components to operate based on respective second optimal operational state associated with the fourth vehicle component, when the fourth set of vehicle components is part of the second set of vehicle components.

10. The vehicle of claim 8, wherein the processor is further configured to:

determine, responsive to obtaining the third trigger signal, that the fourth set of vehicle components is not part of the second set of vehicle components; and cause the fourth set of vehicle components to continue to operate in the preferred operational state, when the fourth set of vehicle components is not part of the second set of vehicle components.

11. The vehicle of claim 8, wherein the processor is further configured to cause, responsive to obtaining the second trigger signal, the set of fourth vehicle components to operate based on respective pre-automation operational state associated with the fourth set of vehicle components.

12. The vehicle of claim 8, wherein the user inputs further comprise an indication of a user preference to cause the fourth set of vehicle components to continue operation in the preferred operational state after obtaining the second trigger signal, and wherein the processor is further configured to:

cause, responsive to obtaining the second trigger signal, the fourth set of vehicle components to continue operation in the preferred operational state when the user inputs comprise the indication.

13. The vehicle of claim 1, wherein the second trigger signal is associated with a request to deactivate the first automation mode.

14. The vehicle of claim 1, wherein the transceiver receives the first trigger signal and the second trigger signal from at least one of a user device or a vehicle Human-Machine Interface (HMI).

15. The vehicle of claim 1, wherein the pre-automation operational states are current operational states associated with the plurality of vehicle components before the first set of vehicle components are caused to operate based on the first optimal operational states.

16. The vehicle of claim 1, wherein the transceiver is further configured to receive user preferences for default operational states of one or more vehicle components of the plurality of vehicle components, and wherein the processor is further configured to:

cause, responsive to obtaining the second trigger signal, the one or more vehicle components to operate in the default operational states.

17. A method comprising:

determining, by a processor responsive to obtaining a first trigger signal, pre-automation operational states associated with a plurality of vehicle components of a vehicle and first optimal operational states associated with a first set of vehicle components of the plurality of vehicle components, wherein:

the first set of vehicle components is associated with a first automation mode, and the first trigger signal is associated with a request to activate the first automation mode of a plurality of automation modes;

storing, by the processor, an information associated with the pre-automation operational states;

causing, by the processor, the first set of vehicle components to operate based on the first optimal operational states;

determining, by the processor responsive to obtaining a third trigger signal, second optimal operational states associated with a second set of vehicle components of the plurality of vehicle components, wherein:

the second set of vehicle components is associated with a second automation mode, the third trigger signal is associated with a request to activate the second automation mode of the plurality of automation modes, and the second automation mode is different from the first automation mode;

causing, by the processor, the second set of vehicle components to operate based on the second optimal operational states;

determining, by the processor responsive to obtaining the third trigger signal, a third set of vehicle components of the plurality of vehicle components comprising one or more vehicle components that are part of the first set of vehicle components and not part of the second set of vehicle components; and restoring, by the processor responsive to obtaining the third trigger signal, operational states associated with the third set of vehicle components back to respective pre-automation operational states associated with the third set of vehicle components.

18. The method of claim 17, further comprising: restoring, by the processor responsive to obtaining a second trigger signal, operational states associated with the first set of vehicle components back to respective pre-automation operational states associated with the first set of vehicle components, wherein the second trigger signal is associated with a request to deactivate the first automation mode.

19. The method of claim 17, further comprising restoring, by the processor responsive to obtaining a second trigger signal, operational states associated with the second set of vehicle components back to respective pre-automation operational states associated with the second set of vehicle components, wherein the second trigger signal is associated with a request to deactivate the second automation mode.

20. A non-transitory computer-readable storage medium having instructions stored thereupon which, when executed by a processor, cause the processor to:

determine, responsive to obtaining a first trigger signal, pre-automation operational states associated with a plurality of vehicle components of a vehicle and first optimal operational states associated with a first set of vehicle components of the plurality of vehicle components, wherein:

the first set of vehicle components is associated with a first automation mode, and the first trigger signal is associated with a request to activate the first automation mode of a plurality of automation modes;

store an information associated with the pre-automation operational states;

cause the first set of vehicle components to operate based on the first optimal operational states;

determine, responsive to obtaining a third trigger signal, second optimal operational states associated with a second set of vehicle components of the plurality of vehicle components, wherein:

the second set of vehicle components is associated with a second automation mode, the third trigger signal is associated with a request to activate the second automation mode of the plurality of automation modes, and the second automation mode is different from the first automation mode;

cause the second set of vehicle components to operate based on the second optimal operational states;

determine, responsive to obtaining the third trigger signal, a third set of vehicle components of the plurality of vehicle components comprising one or more vehicle components that are part of the first set of vehicle components and not part of the second set of vehicle components; and restore, responsive to obtaining the third trigger signal, operational states associated with the third set of vehicle components back to respective pre-automation operational states associated with the third set of vehicle components.

* * * * *